(12) United States Patent
Cerf et al.

(10) Patent No.: US 8,930,429 B2
(45) Date of Patent: Jan. 6, 2015

(54) NETWORK DISTRIBUTED QUANTUM RANDOM NUMBER GENERATION

(75) Inventors: Nicolas Cerf, Brussels (BE); Louis-Philippe Lamoureux, Brussels (BE); Julien Niset, Ixelles (BE)

(73) Assignee: Universite Libre de Bruxelles, Brussels (BE)

( * ) Notice: Subject to any disclaimer, the term of this patent is extended or adjusted under 35 U.S.C. 154(b) by 346 days.

(21) Appl. No.: 13/404,156

(22) Filed: Feb. 24, 2012

(65) Prior Publication Data

US 2012/0221615 A1 Aug. 30, 2012

Related U.S. Application Data

(63) Continuation of application No. PCT/EP2010/061320, filed on Aug. 3, 2010.

(30) Foreign Application Priority Data

Aug. 27, 2009 (GB) .................................. 0915000.4
Dec. 18, 2009 (GB) .................................. 0922156.5

(51) Int. Cl.
*G06F 7/58* (2006.01)
*H04L 9/08* (2006.01)
*H04L 9/06* (2006.01)

(52) U.S. Cl.
CPC .............. *G06F 7/588* (2013.01); *H04L 9/0852* (2013.01); *H04L 9/065* (2013.01)

USPC .......................................................... 708/255

(58) Field of Classification Search
None
See application file for complete search history.

(56) References Cited

U.S. PATENT DOCUMENTS

| | | | |
|---|---|---|---|
| 7,284,024 B1 | 10/2007 | Trifonov et al. | |
| 7,586,888 B2 * | 9/2009 | Wang ............................. | 370/338 |
| 2002/0018563 A1 | 2/2002 | Tichenor | |
| 2008/0147759 A1 * | 6/2008 | Fiorentino et al. ............ | 708/250 |
| 2010/0217789 A1 | 8/2010 | Saitoh et al. | |
| 2012/0221615 A1 * | 8/2012 | Cerf et al. ...................... | 708/250 |
| 2013/0036145 A1 * | 2/2013 | Pruneri et al. ................. | 708/191 |

FOREIGN PATENT DOCUMENTS

| | | |
|---|---|---|
| EP | 1 577 749 A2 | 9/2005 |
| JP | 2008227846 A | 9/2008 |
| JP | 200970009 A | 4/2009 |
| WO | 9858309 A1 | 12/1998 |
| WO | 0055706 A2 | 9/2000 |
| WO | 2007083417 A1 | 1/2006 |

* cited by examiner

*Primary Examiner* — David H Malzahan
(74) *Attorney, Agent, or Firm* — BainwoodHuang

(57) ABSTRACT

A quantum random number generation system includes a source of light output as a plurality of coherent states such that each state has an indeterminate number of photons, a photodetector arranged to receive the light output from the light source and to generate a photocurrent dependent on the number of photons in each coherent state, and processing circuitry connected to receive the photocurrent and arranged to convert it to generate a sequence of random numbers.

16 Claims, 2 Drawing Sheets

NETWORK DISTRIBUTED QUANTUM RANDOM NUMBER GENERATION

FIELD OF THE INVENTION

Figure 1:
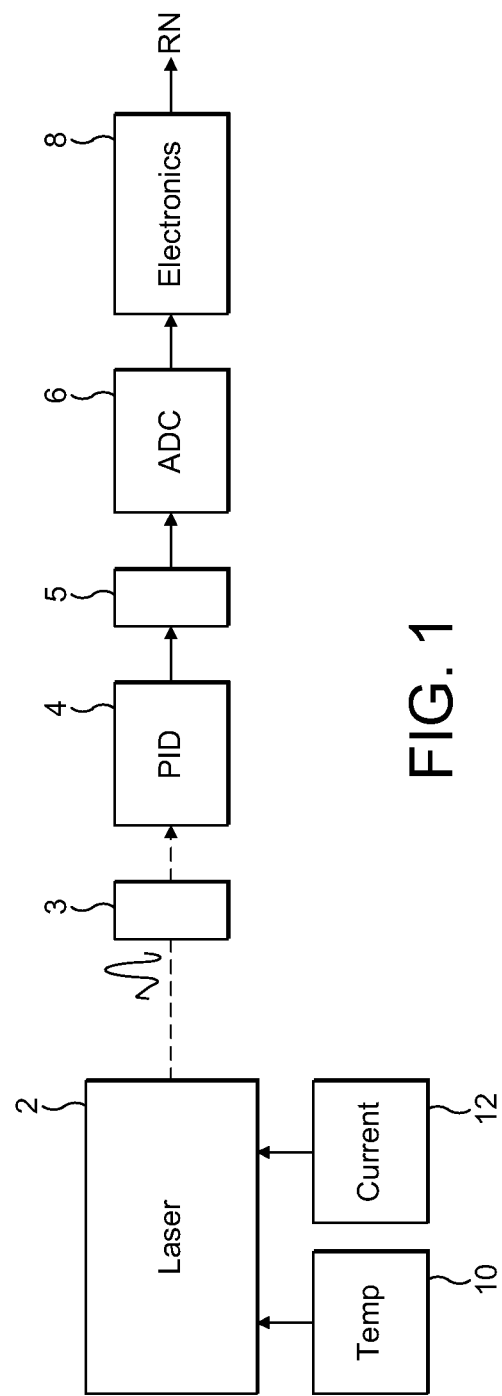

The present invention relates to random number generation, and in particular relates to systems and methods for generating random numbers based on quantum phenomena.

BACKGROUND TO THE INVENTION

Ensuring communication security in complex computer networks is well known to be one of the central challenges of most information and communication technology (ICT) applications, which has resulted in an increased interest for the field of cryptography over the last years. For example, cryptographic encryption (i.e. the process of rendering information unreadable to unauthorized parties) has become of fundamental importance in a myriad of different applications ranging from electronic transactions to military data transmission. The security of a given encryption technique relies on the crucial assumption that users have access to secret keys. A secret key consists in a sequence of genuine random numbers that is equiprobable and unpredictable. Typically, a secret key is processed with the information to protect using an algorithm that renders the result indecipherable, up to an arbitrarily small level, to anyone not in possession of the given key. The origin of the key is central to the security of the data to protect since any information on the source of the key is a liability. A common way to generate secret keys is to use a random number generator (RNG).

A fundamental requirement for random number generation is the ability to produce random sequences that have a uniform probability distribution. In other words, it is the ability to generate numbers with equal probability. Accordingly, a measure of RNG quality in this regard is that it has a small bias, i.e. a small difference between the probability distribution of the RNG output and the uniform probability distribution. Random physical phenomena employed in implementing hardware RNGs pose unique problems in terms of harnessing the phenomena to provide, as digital signals, the needed uniformly distributed random numbers.

A second fundamental requirement for random number generation is the ability to produce actual randomness. Strictly speaking, it is the ability to generate unpredictable numbers, since any correlation among the generated numbers is detrimental. However, today's known random physical phenomena useful for providing genuine random numbers limit the generation rate because of their slowly varying characteristics. For several cryptographic tasks, this crucial point makes physical random number generation unappealing. One widely practiced alternative is to circumvent this problem by replacing uniformly distributed genuine RNGs by uniformly distributed pseudo RNGs.

RNGs thus provide in two distinct categories: pseudo-random number generators (PRNGs) and hardware (or physical) random number generators (HRNGs). A PRNG is a deterministic algorithm for generating a sequence of uniformly distributed numbers that only approximates the properties of genuine random numbers. The sequence is not truly random in that it is completely determined by a relatively small set of initial parameters and eventually repeats due to the finiteness of the computer on which it is running. To initialize a sequence, the algorithm employs an internal state of the computer (called a seed) such as current time, mouse movement or keyboard strokes. The algorithm will always produce the same sequence thereafter when initialized with the same seed. Even though the finite period of certain PRNGs can be very long, this resource becomes meaningless in a cryptographic context if an untrusted third party can correctly guess the PRNG algorithm as well as the initial seed used to generate a secret key.

Generally, pseudo-random numbers are generated by deterministic algorithmic processes such as modular multiplication, which, by careful selection of parameters, yield numbers that are devoid of obvious patterns. Because no physical phenomenon is involved, all elements of pseudo-random sequences are, necessarily, causally related and the sequences may be accurately predicted and replicated. This replication property is fundamental for pseudo-random applications such as the RC4 stream cipher cryptosystem, in which the sender uses a PRNG to encrypt information to be sent and the recipient uses the exact same PRNG to regenerate the sender's plaintext. However, for random number applications, this replication property is a liability, since, for example, in order to maximize security, RSA keys (i.e. exponents and modulus) are generated exclusively by random means.

A cryptographically safer alternative in generating secret keys is to use a HRNG. A HRNG is an apparatus that generates uniformly distributed random numbers from a physical process. Such devices are often based on physical systems such as thermal noise, avalanche noise, or time drift. Although they are described, in principle, by deterministic (and therefore predictable) laws of physics these systems typically contain such high degrees of complexity that they are in practice difficult to simulate. However, HRNGs suffer a major drawback that is the rate at which they can generate random numbers. Most physical systems harnessed to produce secret keys generate numbers at rates that are often a few orders of magnitude smaller than what is required in several cryptographic situations such as those encountered by financial or banking institutions. For this reason, security technicians often resort to using the less secure but faster PRNGs.

HRNGs can be divided in three categories depending on the nature of the physical phenomena used as the source of randomness. HRNGs of the first category are based on macroscopic phenomena and extract their randomness from our inability to properly monitor the evolution of a macroscopic system. A simple example of such macroscopic HRNG entails the roll of six faced dices. These HRNGs are typically very slow and, in theory, completely predictable as macroscopic systems obey the deterministic laws of classical physics.

A second category of HRNGs is based on deterministic phenomena of microscopic origin. These HRNGs extract their randomness from our inability to properly monitor the evolution of a microscopic system. Although the constituents of the system are generally of quantum nature (electrons or photons), the processes used as the source of randomness are classical and in principle predictable. All the uncertainty lies in our inability to characterize the quantum system properly, not in the quantum nature of the system itself. In the language of quantum mechanics, the classical nature of these systems is characterized by the use of mixed states rather than pure states.

Several prior art HRNGs of the first and second category generate random time periods as means to randomly generate numbers. Examples include a so-called "electronic roulette wheel", and a method involving radioactivity by which Random-numbers modulo-M are produced by stopping the rapidly advancing (modulo-M) counter at the random time, determined by an electron arrival of the Geiger-Mueller tube (from a sample of strontium 90). Another recent method in this regard employs user actions such as keystrokes, as means to randomly select numbers from software counters in order to generate secret keys or seeds for PRNGs. The generation rates provided by the former method are obviously much higher than those provided by the latter method, but the rates are nevertheless much smaller than 1 Mbit/sec.

Further prior art HRNGs solutions of the second category use deterministic means to distort random electronic noise, which is normally distributed, in order to provide a 1-bit random variable. One example subjects the noise to successive stages of clipping, amplifying, and sample, whereby the normal distribution is thus directly divided in two, with the probability of each fraction mapped to one of the two possible digits. Another example uses a comparator to severely amplify the difference between the instantaneous output of two sources. In practice, locking the division point at the median in the former example, or locking the two medians in the latter example, within a tolerance that avoids a bias, requires extreme precision and periodic calibration.

Even further prior art solutions of the second category use thermal noise as means to generate random numbers. HRNGs based on this phenomena are vulnerable to attack by lowering the temperature of the system, though most systems will stop operating at temperatures (e.g. 150° K.) low enough to reduce noise by a factor of two. They also suffer from a low generation rate. Some of the thermal phenomena include thermal amplified noise from a resistor, avalanche noise generated from an avalanche diode, atmospheric noise, detected by a radio receiver attached to a computer. As for all HRNGs of the second category, thermal noise is, in principle, deterministic, rendering the random numbers, in principle, predictable.

In comparison with deterministic physics, quantum physics is fundamentally random. It is the only theory within the fabric of modern physics that integrates randomness. It is thus a natural choice to take advantage of this intrinsic randomness and to resort to the use of a quantum process as source for HRNGs. HRNGs of the third category are thus based on true quantum phenomena and extract their randomness from the uncertainty lying at the heart of quantum mechanics.

Recent prior art solutions of this category exploit strongly attenuated coherent pulses consisting on average of a single photon travelling through a semi-transparent mirror. The mutually exclusive events, reflection and transmission, are detected and associated to one of a binary outcome. Although the resulting random sequences are indeed uniformly distributed and unpredictable, this solution remains very slow (e.g. 1 Mbit/sec) because of the slow single-photon avalanche photodetectors needed to measure attenuated light pulses.

U.S. Pat. No. 7,284,024 describes a different approach to a quantum random number generator system that employs quantum noise from an optical homodyne detection apparatus. The system utilizes the quantum noise generated by splitting a laser light signal using a beam splitter having four ports, one of which receives the laser light signal, one of which is connected to vacuum and two of which are optically coupled to photodetectors. Such a system effectively measures the random fluctuations of the vacuum entering the second port of the beam splitter. Processing electronics process the signal derived from subtracting the two photodetector signals to create a random number sequence. The idea is that the difference signal associated with the two photodetectors should be truly random, such that the system is a true random number generator.

In order to operate effectively, such a homodyne detection system requires two identical photodetectors. In the case of non-identical photodetectors (which in practice is likely to be the case), a bias is introduced into the random number generation.

Moreover, maintaining the two photodiodes identical during operation is difficult because of temperature and current fluctuations that may occur independently in both detectors. It is thus problematic to render this system stable and robust. As far as the inventors are aware, the system described in U.S. Pat. No. 7,284,024 has not been put into commercial production.

It is believed that the limitations of the prior art methods and means have resulted in speed and randomness constraints on execution of random number applications that cannot tolerate pseudo-random characteristics such as cryptographic key generation. These limitations have resulted in the use of faster but riskier PRNGs. Consequently, there is a need in the art for a method and means that provide uniformly distributed, genuinely unpredictable, random number sequences, using simpler and more reliable equipment, and providing faster rates.

SUMMARY OF THE INVENTION

The present invention relates to random number generators (RNG) and more particularly to a method and means that exploit intensity quantum random fluctuations of light and use a photodetector followed by the digitizing (with e.g. an analog-to-digital converter or a comparator) of the random fluctuations and produce an output that is processed into a uniformly distributed random variable.

One aspect of the present invention provides a random number generation system comprising: a source of light output as a plurality of coherent states such that each state has an indeterminate number of photons; a photodetector arranged to receive the light output from the light source and to generate a photocurrent having a variance dependent on the number of photons in each coherent state; and processing circuitry connected to receive the photocurrent and arranged to generate a sequence of random numbers.

In the described embodiment, each state is a pure quantum linear superposition of photon number states.

Another aspect of the invention provides a method of generating random numbers comprising: outputting a plurality of coherent states from a source of light, the coherent states excited such that each state has an indeterminate number of photons; receiving the light output at a photodetector and generating a photocurrent by the photodetector, said photocurrent having a variance dependent on the number of photons in each coherent state; and using the photocurrent at processing circuitry to generate a sequence of random numbers.

As explained in more detail in the following, the random nature of numbers which are generated exploits photon number noise produced at high laser intensity.

Preferred embodiments of the present invention provide a system and method of generating rapidly sequences of random numbers having a uniform probability distribution. Embodiments can produce random numbers at a rate of at least 12 Mb/s up to and exceeding 50 Mbs. Some embodiments of the invention are capable of producing random numbers at a rate exceeding 1 Gb/s.

Embodiments provide a method and system where the sequence of random numbers is generated unpredictably and is of quantum mechanical origin.

Further embodiments provide a rapid random number generation system for cryptographic protocols providing increased security for such protocols. In embodiments of the invention, the quantum random number generator operates at high speed and has a very small bias and no periodic calibration requirements.

Figure 2:
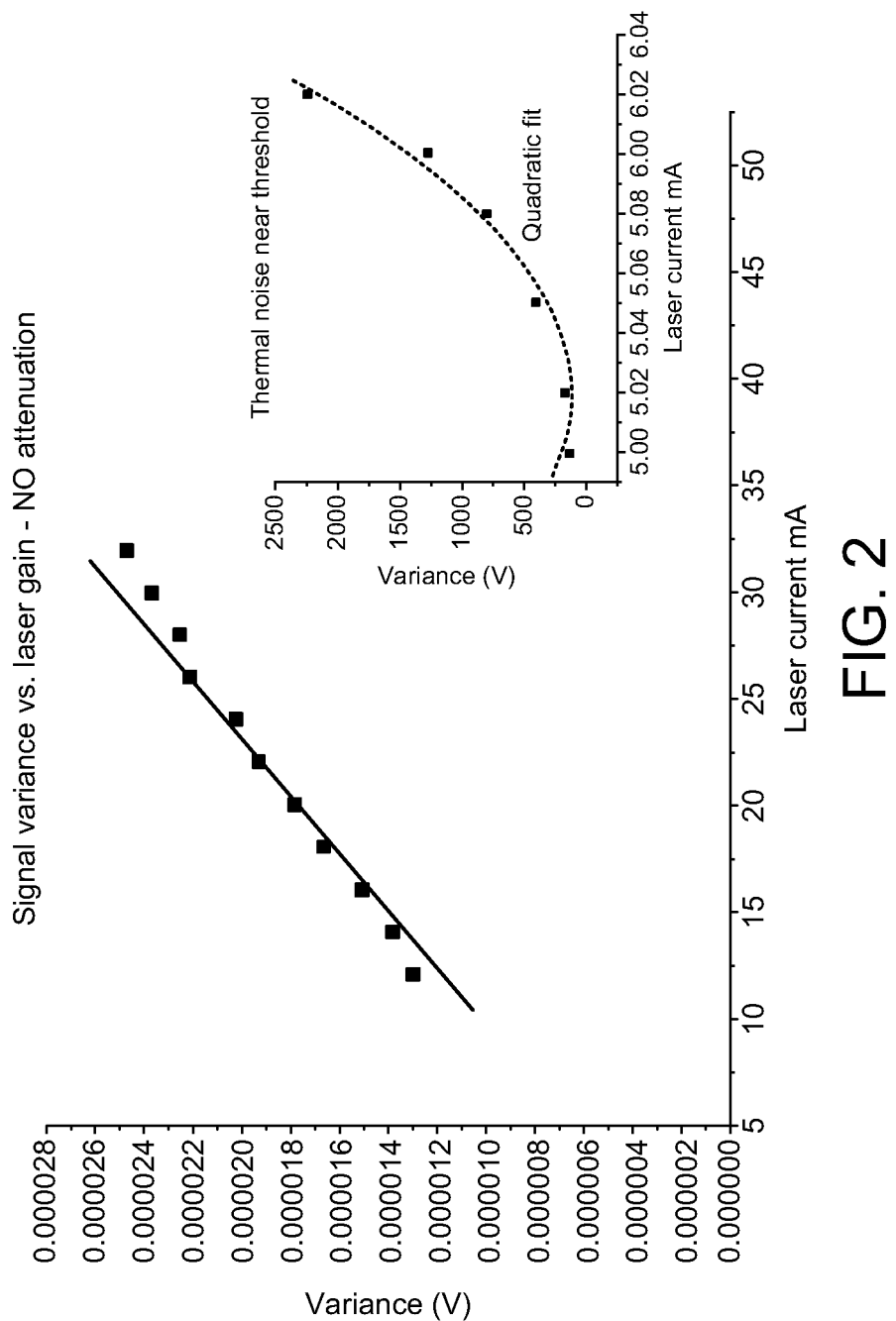

For a better understanding of the present invention and to show how the same may be carried into effect, reference will now be made to the Figures by way of example in which:

FIG. 1 illustrates a schematic block diagram of a system according to an embodiment of the invention; and FIG. 2 shows graphs of signal variance VS laser gain for quantum noise and classical noise.

Reference is made to FIG. 1 which is a schematic block diagram of a random number generation system according to an embodiment of the present invention. The system comprises a laser 2 which is excited to operate well above its excitation threshold such that its output beam is characterized by a coherent state. A temperature controller 10 and current controller 12 are provided to control the operating characteristics of the laser 2.

The output coherent state is measured by a photodetector 4 optionally via an optical attenuator 3 whose purpose is to minimize all classical noise contributions. The photodetector can take the form of, e.g., a simple photodiode. The principle behind using a photodiode is to measure the statistical quantum properties of the coherent state output by the laser 2 because the photocurrent generated by the coherent state will fluctuate as a consequence of underlying fluctuations in impinging photon numbers. This is explained more fully in the following. The output of the photodiode is a photocurrent which is processed by circuitry comprising an amplifier 5, an analog to digital converter ADC 6 and electronics processing circuitry 8, such as a CPU. The output of the circuitry is a sequence of random numbers of uniform probability distribution and substantially without bias.

As briefly discussed above, the described embodiment of the present invention measures photon numbers in each excited coherent state generated by the laser 2. In particular, the inventors are utilizing a phenomenon that photon number uncertainty contained in an excited coherent state will act as a genuine random number generator for the reason that when phase uncertainty is low (such as the excited coherent state) photon number uncertainty is high. This follows from work done by S. M. Barnett and D. T. Pegg and published in their article entitled "On the Hermitian Optical Phase Operator", Journal of Modern Optics, 1989, vol. 36, No. 1, 7-19. They construct a Hermitian optical phase operator and demonstrate that its properties are precisely in accord with the results of semi-classical phenomenological approaches. In particular, they show that for asymptotically excited coherent states, the photon number-phase uncertainty product minimizes Heisenberg's uncertainty principle in the same way the canonical conjugate momentum-position operators do. Consequently, the more precision one gets on the phase of a coherent state, the less precision one gets on the photon number.

This is not a statement about the limitations of one's ability to measure these particular quantities but rather about the nature of the coherent state itself. This implies that when phase uncertainty is low, such as for excited coherent states, photon number uncertainty is high. Accordingly, highly excited coherent states are generally considered the most macroscopic of the quantum states.

The present invention utilizes the photon number uncertainty contained in an excited coherent state as a noise source to create a genuine random number generator system as described herein. Advantages of such a quantum noise source are the high level of randomness, simplicity of the system and the high generation speed of the random numbers. In fact, any limitation on the generation speed of the random numbers is more likely to be a facet of the processing electronics as opposed to the fundamental source of the generation.

The random information is carried by highly excited coherent states that contain many photons. The coherent states are measured by the photodiode where the photocurrent is converted into a binary sequence using the ADC 6 and post-processing electronics 8.

As mentioned above, the QRNG system uses excited coherent states. This type of state can be generated by laser cavities operating well above threshold (typically greater than 4×the threshold current) either in the continuous wave or pulsed regime and in the single-mode or multi-mode regime. Depending on the chosen configuration, frequency post filtering and/or attenuation may be required in addition to attenuation. Furthermore, as photon-number fluctuations are independent of wavelength, no restriction is imposed on the laser optical wavelength. This choice only depends on the responsivity and the sensitivity of the photodiode required to measure photon number fluctuations.

As mentioned, the principle behind using a photodiode to measure the statistical quantum properties of light is that the photocurrent generated by coherent states will fluctuate because of the underlying quantum fluctuations in the impinging photon numbers. These photon number fluctuations will be reflected in the photocurrent fluctuations with a fidelity determined by the responsivity of the photodiode. The fluctuations manifest themselves as noise in the photocurrent.

The time varying photocurrent i(t) can be broken into a time-independent average current <i> and a time varying fluctuation $\Delta i(t)$ according to $i(t)<i>+\Delta i(t)$. The average value of $\Delta i(t)$ must, of course be zero, but, the average of the square of $\Delta i(t)$, namely $<\Delta i(t)^2>$, will not be zero. Since the photocurrent flows through the photodetector's load resistor $R_L$, which then generates energy at the rate of $i(t)^2 R_L$, it is convenient to analyze the fluctuations in terms of a time-varying noise power according to $P_{noise(t)} = \Delta i(t)^2 R_L$.

Let us consider what happens if we illuminate the photodiode with the light from a single-mode laser operating high above threshold. Such coherent light can be considered a plurality of coherent states, and is expected to have Poissonian statistics, in which the photon number fluctuations obey $(\Delta n)^2 = \bar{n}$ where n is the average photon number.

The photoelectron statistics will therefore also follow a Poisson distribution with variance $(\Delta N)^2 = <N>$. Since i(t) is proportional to the number of photoelectrons generated per second, it follows that the photocurrent variance will satisfy $(\Delta i)^2 \alpha <i>$. On taking the Fourier transform of i(t) and then measuring the variance of the current fluctuations within a frequency bandwidth $\Delta f$, we find the Poissonian fluctuations, in this case of quantum origin $(\Delta i)^2 = 2e\Delta f<i>$ (Equation 1). The corresponding noise power is given by $P_{noise(f)} = 2eR_L \Delta f<i>$. The characteristic features of this quantum (short-noise) is that:

The variance of the current fluctuations is directly proportional to the average value of the current.

The noise spectrum is white, that is, independent of frequency.

The second characteristic is a consequence of the random timing between the arrival of the photons in a beam with Poissonian statistics. The "whiteness" of the noise, is, of course, subject to the response time $\tau_D$ of the photodiode, which means that in practice the shot-noise can only be detected up to a maximum frequency of $\alpha(1/\tau_D)$.

In the limit of a large coherent amplitude the Poissonian photon number distribution is well approximated by a continuous Gaussian distribution. Based on the approximation, the coherent state phase fluctuations $\Delta phi$ are inversely proportional to the photon number statistics: $(\Delta phi)^2=1/(4*\bar{n})$ such that the number-phase uncertainty product for this highly excited coherent state is asymptotically $\Delta n*\Delta phi=1/2$. In particular, this shows that the uncertainty product saturates Heisenberg's uncertainty principle proving that photon number fluctuations of a highly excited (strong) coherent state are completely determined by quantum mechanics and are thus unpredictable.

It is important to note that all light sources will exhibit some classical intensity fluctuations due to noise in the electrical drive current, and lasers are subject to additional classical noise such as mechanical vibrations in the laser cavity mirrors. These classical noise sources tend to produce intensity fluctuations at fairly low frequencies (<1 MHz), and so the noise spectrum tends to be well above the quantum-noise level in the low-frequency limit. However, at high frequencies (for example exceeding 1 MHz) these classical noise sources are no longer present, and we are left with the fundamental fluctuations resulting from the coherent photon quantum statistics. The absence of such a classical noise can be verified by checking the scaling of the photocurrent variance or a function of the drive current. As is illustrated in FIG. 2, this scaling is quadratic for classical noise (the smaller graph with black dots) whereas it is linear for quantum noise (the larger graph with diamonds).

Hence a typical spectrum of our invention will show a noise level well above the quantum-noise limit at low frequencies, but should eventually reach the quantum-noise limit at high frequencies. The high frequency roll-off only reflects the frequency imposed by the photodetector response time $\tau_D$.

Another important characteristic of the photodetector is its efficiency. Indeed, the benefits of a high efficiency photodetector are twofold. On the one hand, it guarantees that the photocurrent fluctuations are dominated by the photon fluctuations of the light beam and not the thermal noise of the photodetector. That is, the photodetector efficiency should be chosen in such a way that the ratio of quantum noise to the photodetector thermal noise be high enough to guarantee that the digitization process be based on the quantum fluctuations and not the thermal noise. On the other hand, it ensures that we measure the correct photocount statistic. In some examples, a photodiode efficiency of 90% or at least 75% can be used.

Indeed, the present invention aim at exploiting fluctuations of quantum mechanical nature as opposed to classical since the former are fundamentally random. The difference between the two types of statistics is that the distribution for classical light is broader (super-Poissonian) than for the quantum (Poissonian) distribution. Indeed, if there are any classical fluctuations in the intensity, then we expect to observe larger photon number fluctuations than for the case with a constant intensity. Since a perfectly stable intensity gives Poissonian statistics, it follows that all classical light beams with time-varying light intensities will have super-Poissonian photon number distributions. For example, thermal light from a black-body source, chaotic (partially coherent) light from a discharge lamp, and a laser near its threshold fall into this category. These types of light are clearly noisier than perfectly coherent light in the sense that they have a larger photon number fluctuation.

More precisely, the photon statistics for a single mode of thermal light is described by a Bose-Einstein distribution $\Delta n^2=\bar{n}+\bar{n}^2$ in comparison to a Poisson distribution for a coherent light beam which has a variance of $\Delta n^2=\bar{n}$.

We consider the photocount statistics measured in a given time interval. We are interested in the relationship between the variance in the photocurrent $(\Delta N)^2$ and the corresponding variance $(\Delta n)^2$ in the number of photons impinging on the detector in the same time interval. This relationship is given by $(\Delta N)^2=\eta^2(\Delta n)^2+\eta(1-\eta)\bar{n}$, where $\eta$ is the quantum efficiency of the detector, defined as the ratio of the average photocount number $\bar{N}$ to the mean photon number $\bar{n}$ incident on the detector in the same time interval: $\eta=\bar{N}/\bar{n}$. Three important conclusions can be drawn:

If $\eta=1$, we have $\Delta N=\Delta n$ and the photocount fluctuations faithfully reproduce the fluctuations of the incident photon stream.

If the incident light has Poissonian statistics, with $(\Delta n)^2=\bar{n}$ then $(\Delta N)^2=\eta\bar{n}=\bar{N}$ for all values of $\eta$. In other words, the photocount statistics always give a Poisson distribution.

If the incident light has super-Poissonian statistics and $\eta<<1$, the photocount fluctuations tend to the Poissonian result with $(\Delta N)^2=\eta\bar{n}=\bar{N}$ irrespective of the underlying photon statistics.

Therefore, to measure the correct photon statistics a detector with high enough efficiency is needed. In such a case, the photocount statistics give a true measure of the incoming photon statistics, with a fidelity that increases as the detector efficiency increases. Indeed, an imperfect detector of efficiency $\eta$ is equivalent to a perfect detector of 100% efficiency with a beam splitter of transmission $\eta$ in front of it. The random sampling nature of the beam splitting process gradually randomizes the statistics, irrespective of the original statistics of the incoming photons. In the limit of very low efficiencies, the time intervals between photoelectrons would become completely random and the counting statistics would be Poissonian for all possible incoming distributions.

Furthermore, as mentioned above, the photodetector efficiency should be chosen in such a way that the ratio of quantum noise to the photodetector thermal noise be high enough to guarantee that the digitization decision process be based on the quantum fluctuations and not the thermal noise.

When using high-intensity beams and photodiode detection, quantum efficiencies approaching 90% can be obtained.

A WORKING EXAMPLE

A working example was constructed according to FIG. 1 based on the following components:

Temperature Controller 10
  THORLABS Laser Diode Temperature Controller TED 200
Current Controller 12
  THORLABS Laser Diode Current Controller LDC 201 CU
  Noise without ripple (10 Hz . . . 10 MHz, rms), typ.: <0.2 µA
  Ripple (50/60 Hz, rms), typ: <0.5 µA
  Drift at constant temperature (24 hours, 0 . . . 10 Hz), typ: <2 µA
Laser 2
  Bookham LC25W-A
  Threshold: 8 mA
  Gain: 0.3 mW/mA
  Peak wavelength: ±1550 nm
  Time averaged spectral linewidth: 0.1 nm
Photodetector 4
  THORLABS DET01CFC
  Type: InGaAs PIN
  Wavelength range: 800-1700 nm
  Peak wavelength: 1550 nm
  Peak wavelength response: 0.95 A/W
  Bandwidth: 2 GHz
  Dark current: 0.7 nA Shunt resistance: 1000 Ohm
NEP: 1.5E-15 W/sqrt(Hz)
Amplifier 5
   FEMTO HSA-X-1-40
   Bandwidth: 1.1 GHz
   Gain 40 dB
   Noise Figure: 1.9 dB
   Equivalent input voltage noise: 330 pV/sqrt(Hz)
ADC 6
   Agilent Acqiris 8-bit Digitizer
   Sampling Rate: 2 GSample/sec
   Resolution: 8 bit (256 "steps")
   Min. full scale range: [−25, 25] mV For the above setup, we calculated the ratio between quantum and classical fluctuations as they propagate through the system. The temperature and wavelength are stabilized through the temperature controller 10. Suppose 50 mA (>4 times the 8 mA laser threshold) is injected. The current controller 12 adds a maximum additional 0.5 µA low frequency thermal noise which should be suppressed in frequency filtering. Indeed, as specified above, this noise is located in the lower frequencies and should be filtered along with other parasites such as 100 MHz FM radio frequencies. For a laser gain of 0.3 mW/mA, 50 mA will generate 15 mW of optical power while the 0.5 µA thermal noise will generate a negligible 0.15 nW. As for the optical quantum fluctuations, they vary as the square root of the average optical power (as explained later) such that $\overline{hw}\Delta n = \sqrt{15} = 3.87$ mW. The ratio for the optical quantum and classical fluctuations is $R = 10 \text{ LOG } (0.00387/0.00000000015) = 74$ dB. As we can see, this ratio removes the need for attenuation since quantum mechanical fluctuations are clearly dominant. Once impinging the detector, the optical signal is converted to a current with a 0.95 mA/mW conversion ratio. The average current is converted to 14.25 mA while the fluctuations are converted, using Equation 1 with a 2 GHz bandwidth, to 0.0955 mA. This value must now be compared with the sources of classical thermal noise generated by the photodiode. Thermal noise RMS is expressed (in amps) as $\sqrt{4kT/\tau_F R}$ where k is Boltzman's constant, T the absolute temperature, $1/\tau_D$ the bandwidth and R the shunt resistance. For this particular case, at room temperature, we get 1.8 nA. Another classical noise source is dark current noise. In comparison with thermal noise, the average value is non-zero. In this case, it is 0.7 nA, negligible to the average generated current. Applying Equation 1 to the dark current yields 1.26 nA of fluctuations. Although the photodiode's classical noise contribution are small with 4 orders of magnitude in comparison to quantum noise, they are nevertheless bigger than the current controller's. In our setup, the photocurrent had to be amplified in order to be "seen" by the ADC using a 40 dB transimpedance amplifier with a 1.9 dB noise figure. It will be appreciated that an amplifier may not be necessary where the generated photocurrent is sufficiently high.

The tested set-up yields a generation at the rate of 1 Gbit/sec and passes standard statistical randomness tests.

Embodiments of the present invention are a potential alternative to the usual RNG techniques devised so far. As RNGs lack high generation rates or genuine randomness (or both), the present invention benefits from the genuine randomness of quantum mechanics (QRNG) and in theory can operate at an infinite bandwidth so that the generation rate is limited not by the physical system itself but rather by technological constraints which are nevertheless in a constant state of improvement. The latter point can be explained by the fact that the photon number fluctuations exploited here are in theory present at all frequencies.

In contrast to previous QRNGs proposals, this shows that there is no need for strongly attenuated coherent states and/or homodyne detection systems in the context of quantum random number generation: an equivalent level of randomness can be obtained by generating and measuring intense coherent states, an easier and faster task compared to measuring single photons which necessitate slow single photon counters or measuring vacuum fluctuations by stabilizing two identical photodiodes.

Our method uses shot-noise limited coherent detection, which works at much higher repetition frequencies (>1 GHz) than single-photon detectors (1 MHz), so that high bit rates can indeed be achieved. The generated numbers remain, in principle, genuinely random, with no adjustments to be made even after long periods of time A Network Distributed Application Although the production of genuine randomness and a high generation rate are fundamental objectives of RNG systems, integrating an RNG system within a network is also essential to safeguard information in risky communication infrastructures whether they be commercial, bureaucratic or military. Indeed, due to the development of more powerful computers and the exponential growth of networks such as the Internet, the cryptographic methods that underpin secure communications within networks become increasingly under threat. A network security system is only as strong as its weakest link. One weak link in today's data security systems is key generation and distribution.

Therefore, one embodiment of the present invention is designed as a layer 2 QRNG (data link layer QRNG). Layer 2 refers to the data link layer in a multilayered network protocol. Securing layer 2 transactions is fundamental because this layer is common to all kinds of node connections in a network. The security processing is made transparently to the users and to the other protocols. Securing this layer is a more optimized approach than securing the upper OSI layer (Open System Interconnection layer) since neither additional encapsulation nor header are required. For example, the Point to Point Protocol [RFC1661] is a layer 2 protocol. This protocol uses classical cryptography algorithms (e.g. DES or 3DES). The security of these algorithms rest upon unproven mathematical conjectures as opposed to "unconditional" evidence of security in terms of information theory. It rests thus on what one calls the "computational" assumptions, i.e. on the idea that certain problems are difficult to solve and that one can control the lower limit of time necessary to the resolution of these problems. In this context, security cannot be guaranteed. It is a crucial problem for an effective protection of sensitive data, critical infrastructures and services.

An example embodiment of such a layer 2 QRNG has a form factor of a 1 U rack-mounted device supporting multi-protocol infrastructures such as ATM, SONET, Fibre channel and Ethernet. This embodiment can be used to secure multi-point networks across LAN and WAN services and support fully meshed topologies. This embodiment delivers a throughput that ranges from 10 Mbps up to at least 10 Gbps.

More precisely, this embodiment enables to secure Ethernet networks, both in point-to-point and multipoint topologies. This embodiment can support jumbo frames, VLANs (802.1Q) and provides secure remote management through SNMPv3 and In-band management. This embodiment is fully transparent to its respective network with a bandwidth availability of 100% and a latency of maximum 10 microseconds. It also allows the management of 4000 VLANS, 60,000 new sessions per second, a maximum of 2,000,000 sessions while providing active/active high availability hardware redundancy with full support for configuration and session synchronization. Furthermore, this embodiment enables management software and firmware updates while in service avoiding any interruptions. Finally, through a master/slave mechanism, this embodiment implements a fail-over feature that enables to fail from the master appliance to a slave appliance that takes control of the QRNG network if necessary.

In summary, the described embodiments disclose a quantum random number generator system that employs quantum noise from a coherent state of light is disclosed. The system exploits photon number quantum random fluctuations inherent to excited coherent states. For this type of state, the photo number fluctuations saturate Heisenberg's number-phase uncertainty relation guaranteeing an absolute level of randomness. The system is composed of a laser generating such a coherent state, a photodetector measuring the intensity fluctuations of the coherent state and processing electronics that transform the photocurrent fluctuations into a sequence of random numbers. Because the photocurrent fluctuations are proportional to the intensity quantum random fluctuations, the system is a true random number generator.

The invention claimed is:

1. A quantum random number generation system comprising:
   a source of light output as a plurality of coherent states such that each state has an indeterminate number of photons;
   a photodetector arranged to receive the light output from the light source and to generate a photocurrent dependent on the number of photons in each coherent state; and
   processing circuitry connected to receive the photocurrent and arranged to convert it to generate a sequence of random numbers.

2. A random number generation system according to claim 1, wherein the photodetector comprises a photodiode.

3. A random number generation system according to claim 1, wherein the coherent states are excited such that the variance in the photocurrent arising from the quantum fluctuations of the number of photons in each coherent state exceeds variances from other sources in the system.

4. A random number generation system according to claim 1, wherein the processing circuitry comprises a comparator arranged to receive the photocurrent and processing electronics for processing the digital output of the comparator to generate said sequence of random numbers.

5. A random number generation system according to claim 1, wherein the source of light comprises a laser generating a coherent state.

6. A random number generation system according to claim 5, wherein the laser is caused to operate at greater than four times its excitation threshold.

7. A network comprising a plurality of interconnected nodes and a random number generation system according to claim 1 arranged to supply the sequence of random numbers for safeguarding information in the network.

8. A network according to claim 7, wherein the sequence of random numbers is supplied in a data link layer of a network protocol.

9. A random number generation system according to claim 1, wherein the processing circuitry comprises an analogue to digital converter arranged to receive the photocurrent and processing electronics for processing the digital output of the analogue to digital converter in a digitization process to generate said sequence of random numbers.

10. A random number generation system according to claim 9, wherein the photodetector has an efficiency such that the ratio of quantum noise to the photodetector thermal noise be high enough to guarantee that the digitization decision process be based on the quantum fluctuations of a coherent state.

11. A random number generation system according to claim 1, comprising a network link for providing the sequence of random numbers to a network.

12. A random number generation system according to claim 11, wherein the network link operates at a data link layer of a network protocol.

13. A method of generating random numbers comprising:
   outputting a plurality of excited coherent states from a source of light, the coherent states excited such that each state has an indeterminate number of photons;
   receiving the light output at a photodetector and generating a photocurrent by the photodetector, said photocurrent having a variance dependent on the number of photons in each coherent state; and
   using the photocurrent at processing circuitry to generate a sequence of random numbers.

14. A method according to claim 13, wherein the step of outputting a plurality of excited coherent states comprises operating a laser.

15. A method according to claim 13, wherein the step of using the photocurrent to generate a sequence of random numbers comprises supplying the photocurrent to an analog to digital converter or a comparator of the processing circuitry to generate an output, and supplying the output to processing electronics of the processing circuitry to generate said sequence of random numbers.

16. A method according to claim 13, wherein the generated random numbers are exploited within a network.

* * * * *